(12) United States Patent
Mani et al.

(10) Patent No.: US 8,914,842 B2
(45) Date of Patent: Dec. 16, 2014

(54) ACCESSING ENTERPRISE RESOURCE PLANNING DATA FROM A HANDHELD MOBILE DEVICE

(75) Inventors: Mugunthan Mani, Andhra Pradesh (IN); Vetrivel Chandranath, Andhra Pradesh (IN); Ramalingam Kothandam, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/355,571

(22) Filed: Jan. 23, 2012

(65) Prior Publication Data

US 2013/0191878 A1 Jul. 25, 2013

(51) Int. Cl.
*H04L 29/08* (2006.01)

(52) U.S. Cl.
CPC ...................................... *H04L 67/26* (2013.01)
USPC .............................................. 726/1; 713/160

(58) Field of Classification Search
USPC ............................................................. 726/1
IPC ...................................................... H04L 77/26
See application file for complete search history.

(56) References Cited

U.S. PATENT DOCUMENTS

| | | | |
|---|---|---|---|
| 7,610,618 B2 * | 10/2009 | Patrick ............................... | 726/7 |
| 7,895,336 B2 | 2/2011 | Cameron et al. | |
| 7,900,247 B2 * | 3/2011 | Chong ............................. | 726/10 |
| 7,958,226 B2 * | 6/2011 | Bernardi et al. .............. | 709/224 |
| 8,069,476 B2 * | 11/2011 | Kinser et al. ...................... | 726/8 |
| 8,141,139 B2 * | 3/2012 | Hinton et al. ..................... | 726/8 |
| 8,321,437 B2 * | 11/2012 | Lim ............................... | 707/758 |
| 8,327,419 B1 * | 12/2012 | Korablev et al. .................. | 726/2 |
| 2006/0205434 A1 * | 9/2006 | Tom et al. ...................... | 455/558 |
| 2006/0259776 A1 * | 11/2006 | Johnson et al. ............... | 713/185 |
| 2008/0289020 A1 * | 11/2008 | Cameron et al. .................. | 726/9 |
| 2009/0177894 A1 * | 7/2009 | Orsini et al. ................... | 713/193 |
| 2009/0178112 A1 * | 7/2009 | Doman et al. ..................... | 726/1 |
| 2009/0318126 A1 | 12/2009 | Schimitzek | |
| 2010/0154041 A1 * | 6/2010 | Dalzell et al. ..................... | 726/6 |
| 2010/0191576 A1 * | 7/2010 | Raleigh .......................... | 705/10 |
| 2011/0252147 A1 | 10/2011 | Ewe et al. | |
| 2011/0271321 A1 * | 11/2011 | Soppera et al. .................... | 726/1 |
| 2012/0060207 A1 * | 3/2012 | Mardikar et al. ................. | 726/4 |
| 2012/0151568 A1 * | 6/2012 | Pieczul et al. .................... | 726/8 |
| 2012/0159601 A1 * | 6/2012 | Dalzell et al. ..................... | 726/9 |
| 2013/0014243 A1 * | 1/2013 | Chen et al. ........................ | 726/8 |
| 2013/0110676 A1 * | 5/2013 | Kobres ....................... | 705/26.41 |
| 2013/0227663 A1 * | 8/2013 | Cadenas Gonzalez ........... | 726/6 |

OTHER PUBLICATIONS

"Dynamics-Mobility", Retrieved at <<http://www.dynamics-mobility.com/mobile-erp.htm>> Retrieved Date Dec. 7, 2011, pp. 2.
"Mibuso", Retrieved at <<http://www.mibuso.com/bdinfoprint.asp?CompanyID=2891>> Retrieved Date Dec. 7, 2011, pp. 2.

(Continued)

*Primary Examiner* — Techane Gergiso
(74) *Attorney, Agent, or Firm* — Damon Rieth; Jim Ross; Micky Minhas

(57) ABSTRACT

A user can access data from an ERP system, through a handheld mobile device, using claims-based authentication information. An authentication service authenticates the user, using an appropriate authenticator, given the claims-based authentication information. New users can register, and once registered, they can receive business data from ERP mobile data accessing system and push service.

17 Claims, 8 Drawing Sheets

(56) References Cited

OTHER PUBLICATIONS

"Navmobile", Retrieved at <<http://www.navmobile.net/Solutions.aspx>> Retrieved Date Dec. 2, 2011, pp. 2.

Morgenstern, David, "Apple's New Enterprise Push: Ipad and Mobile ERP?", Retrieved at <<http://www.zdnet.com/blog/apple/apples-new-enterprise-push-ipad-and-mobile-erp/6450>> Apr. 4, 2010, pp. 5.

Dabkowski, Andrzej, "Comprehensive Framework for Mobile ERP System", Retrieved at <<http://ieeexplore.ieee.org/stamp/stamp.jsp?tp=&arnumber=1232134>> in the proceedings of the 14th International Workshop on Database and Expert Systems Applications (DEXA'03), Sep. 15, 2003, pp. 890-894.

* cited by examiner

ACCESSING ENTERPRISE RESOURCE PLANNING DATA FROM A HANDHELD MOBILE DEVICE

BACKGROUND

Mobile devices are currently in wide use. In fact, handheld mobile devices are gaining wide use, very quickly. Such handheld mobile devices include cellular telephones, smart phones, personal digital assistants, tablet computers, handheld multimedia players with network connectivity, etc.

These types of devices are increasingly being used by workers who work away from the office. One recent survey shows that over half (approximately 65%) of workers in the United States work away from the office to some degree. This number is expected to rise to over 80% in the very near future. Similarly, some trends show that of those people that work away from the office, a decreasing percent of them are performing work on desktop computers, and an increasing percent of them are performing work on a handheld mobile device.

In performing work away from the office, many users need to access business data on a business data system maintained by their work organization. Such business data systems are sometimes referred to as enterprise resource planning (ERP) systems. In general ERP systems integrate internal and external management information across an entire organization. Various types of information include finance and accounting information, manufacturing information, sales and service information, customer relationship management information, and other business information. ERP systems automate business activity related to this type of information using an integrated software application. ERP systems often attempt to facilitate the flow of information between all business functions inside the organization, and to manage the connections to interested parties that reside outside the organization. ERP systems, while they can run on a wide variety of different hardware and different network configurations, often include a data store that serves as a repository for the business information. The system generally operates in real-time (or near real-time).

The discussion above is merely provided for general background information and is not intended to be used as an aid in determining the scope of the claimed subject matter.

SUMMARY

A user can access data from an ERP system, through a handheld mobile device, using claims-based authentication information. An authentication service authenticates the user, using an appropriate authenticator, given the claims-based authentication information. New users can register, and once registered, they can receive business data from an ERP system through a mobile data accessing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
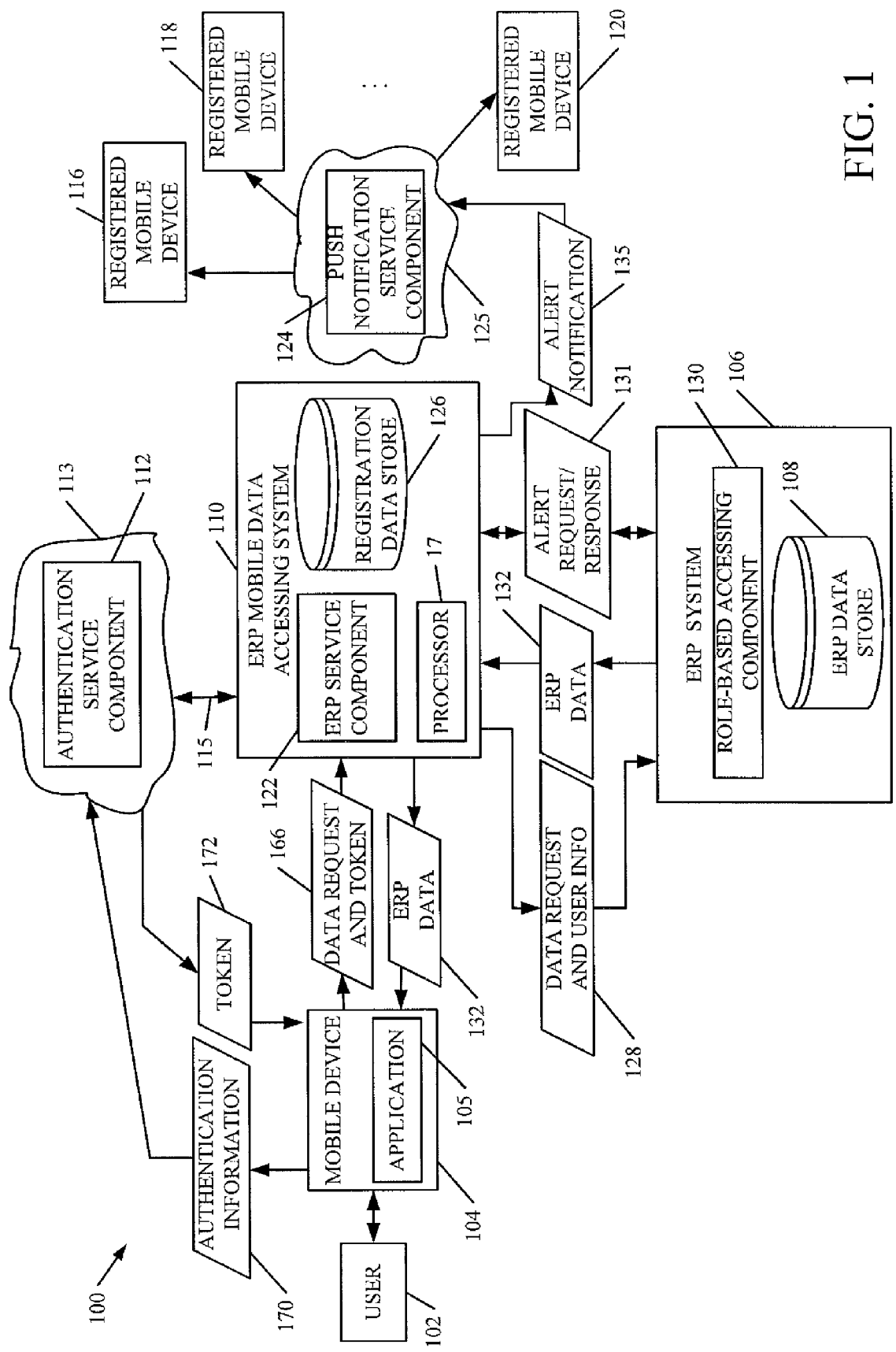
FIG. 1 is a block diagram of one illustrative embodiment of an accessing system for accessing ERP data using a mobile device.

FIG. 1 is a block diagram of one illustrative architecture 100 for accessing ERP data using a handheld mobile device. In the embodiment shown in FIG. 1, user 102 uses handheld mobile device 104 (which includes an application 105) to access data in ERP system 106 that is illustratively stored in an ERP data store 108. Handheld mobile devices include things such as smart phones, cellular phones, personal digital assistants, multimedia players with network connectivity, tablet computing devices and electronic readers. Each illustratively includes a computer processor with associated timing and storage.

Prior to accessing ERP data, the user interacts with authentication service component 112 (which is shown in cloud 113) to receive an authentication token that can be used to authenticate the user in data accessing system 110. In accessing ERP data, the user interacts with ERP mobile data accessing system 110, which, itself, receives and validates the token from the user 102 and allows or denies access to ERP system 106 based on the validation. In one embodiment, the authentication performed by component 112 comprises claims-based authentication information. The operation of architecture 100 is described in greater detail below with respect to FIGS. 2A and 2B.

FIG. 1 also shows that system 110 can be connected to a plurality of additional registered mobile devices 116, 118, and 120 and their corresponding users. Once a mobile device is registered with system 110, system 110 can provide those mobile device with alerts, messages, ERP data, or any other desired information, as set up by the user, and as authorized for that user.

FIG. 1 further shows that ERP mobile data accessing system 110 includes ERP service component 122 and registration data store 126. In addition system 110 includes processor 17 that comprises a computer processor with associated timing and storage (not shown). Processor 17 illustratively is coupled to and activated by other components to facilitate their functionality. ERP service component 122 illustratively receives authentication information from user 102, through mobile device 104 and uses that information to register and validate mobile device 104 and user 102 and store the registration information in registration data store 126. Once mobile device 104 is registered it can receive ERP data in the future, without having to be re-registered.

Figure 2A:
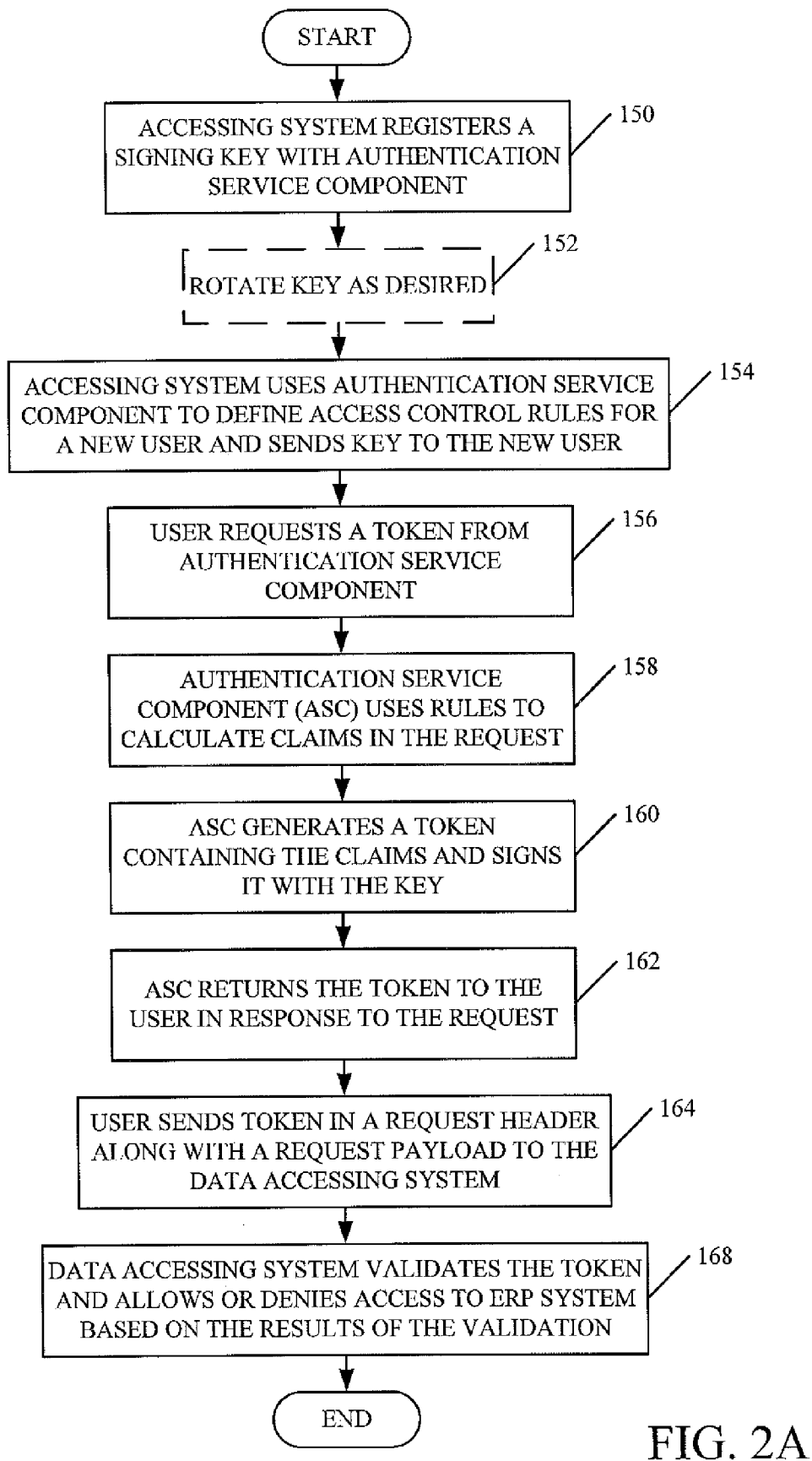
FIG. 2A is a flow diagram illustrating one exemplary embodiment of the operation of the system shown in FIG. 1 in preparing for a new user to access data.

Before discussing FIG. 2A, it will be noted that, in the embodiment shown in FIG. 1, authentication service component 112 is shown in cloud 113. Thus, authentication service component 112 is provided as a service from cloud 113, and this is discussed in greater detail below. In one embodiment, authentication service component 112 is a claims-based authenticator. It can authenticate a user based on a variety of different types of authentication information, and not just information in the context of ERP system 106. For instance, if user 102 provides authentication information such as a user name and password to the user's social network, component 112 performs authentication based on that information. The user can thus be authenticated using information from a work context, a social context or otherwise. Other embodiments can be used as well. This is one embodiment and it is given by way of example only.

FIG. 2A is a flow diagram illustrating one embodiment of the operation of the architecture 100 shown in FIG. 1 in which data accessing system 110 prepares to provide access to a new user. In one embodiment, data accessing system 110 first registers a signing key with authentication service component 112. This is indicated by arrow 115 and the signing key is used to provide tokens to new users so that they can be authenticated by data accessing system 110. Data accessing system 110 uses the key to validate the signature on tokens that it receives from various mobile devices 104. Registering the signing key is indicated by block 150 in FIG. 2A.

It will also be noted that, in one embodiment, the signing key can be rotated, as desired. This is optional and is indicated by the dashed box 152 shown in FIG. 2A.

Data accessing system 110 then uses authentication service component 112 to define access control rules for a new user, and then sends the key to mobile device 104 of the new user 102. Authentication service component 112 uses the rules to identify claims present in tokens that it issues. Thus, in preparing for a new user 102 to access ERP system 106, data accessing system 110 and authentication service component 112 may have one or more new rules and an issuer and either system 110 or component 112 distributes the issuer key material to the mobile device 104 of user 102. This is indicated by block 154 in FIG. 2A.

Once mobile device 104 has the key, and before accessing ERP data through ERP mobile data accessing system 110, mobile device 104 requests a token from authentication service component 112. Mobile device 104 does this using the key that was transmitted to it from data accessing system 110 (or component 112). Device 104 can do this by directly sending the key to authentication service component 112, or by generating a token and signing it using the key and sending the signed token to component 112, or otherwise. In any case, requesting a token from authentication service component 112 is indicated by block 156 in FIG. 2A.

After receiving the token request, authentication service component 112 extracts claims from the token request and uses the existing rules to calculate the claims that are to be presented in an appropriate token response. After the claims are calculated, authentication service component 112 creates a token that contains those claims and signs the token using the key registered with it at step 150. Generating the claims and generating the token are indicated by blocks 158 and 160 in FIG. 2A. Authentication service component 112 then returns the token to mobile device 104 with a response to the token request. This is indicated by block 162 in FIG. 2A.

In one embodiment, application 105 is a mobile device application that allows the user to access ERP data from ERP data store 108 using ERP mobile data accessing system 110. The claims generated by authentication service component 112 are illustratively stored in application 105 so application 105 can use them in interacting with data accessing system 110 to access ERP data through a secured connection. Once mobile device 104 receives the token (and is thus authenticated with authentication service component 112) user 102 can access various features of application 105 which allow the user to access the ERP data.

Therefore, as indicated by block 164 in FIG. 2A, application 105 on mobile device 104 now allows user 102 to send a data request to data accessing system 110. The data request illustratively includes the token in a header of the request along with user identification information such as a URL corresponding to mobile device 104. The request payload identifies parameters that define the particular ERP data that the user wishes to receive. The data request is indicated by block 166 in FIG. 1. Data accessing system 110 then validates the token and either allows or denies access to the ERP system 106 based on the results of that validation. This is indicated by block 168 in FIG. 2.

Figure 2B:
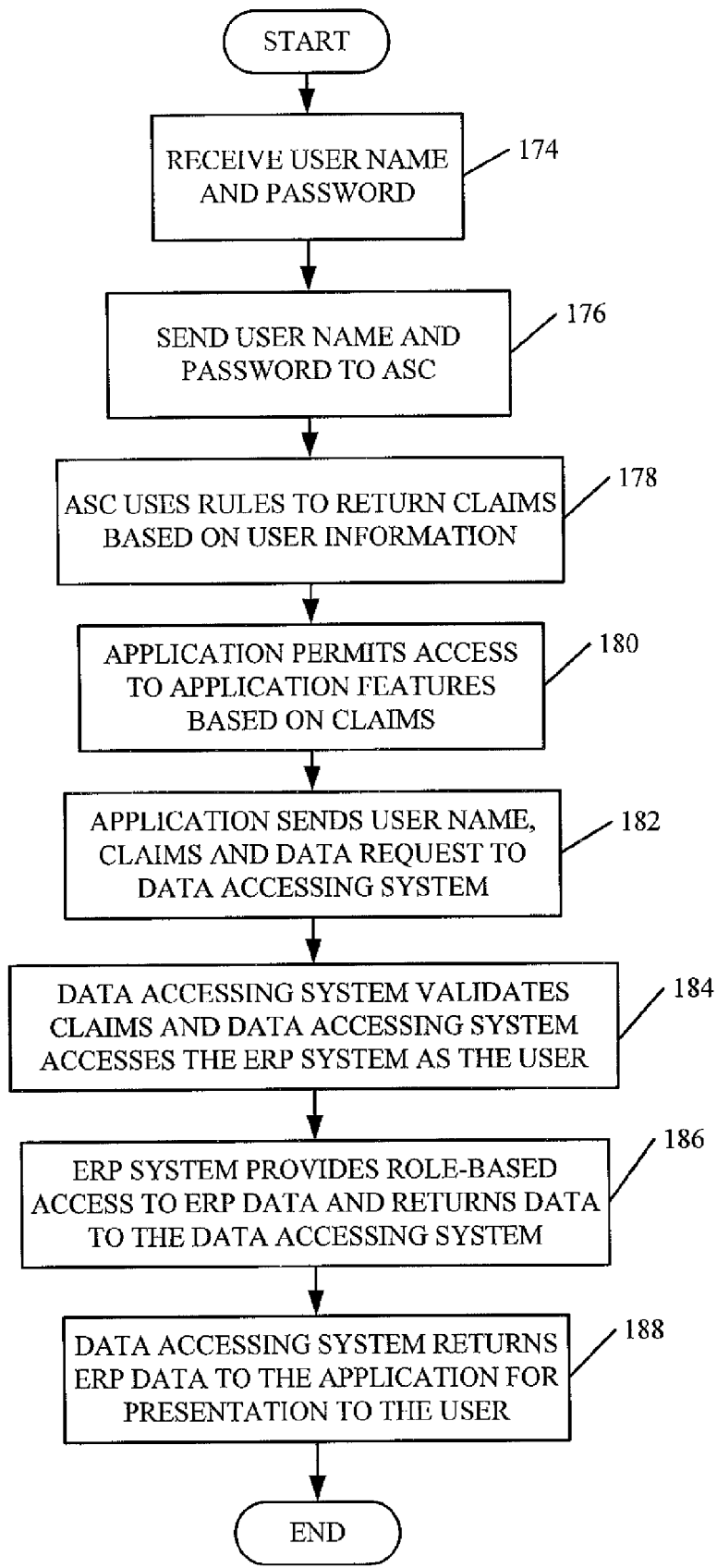
FIG. 2B is a flow diagram illustrating one exemplary embodiment of the operation of the system shown in FIG. 1 in accessing data.

FIG. 2B shows a flow diagram of a more detailed operation of the system shown in FIG. 1 in permitting the user to access ERP data 108 in ERP system 106, through data accessing system 110. In one embodiment, application 105 first generates a log-on display page that allows the user 102 to enter authentication information, such as a user name and password. When the user inputs that information, mobile device 104 sends the authentication information 170 to authentication service component 112 to obtain the token, as described above. Authentication service component 112 uses the rules to return the claims based on the user information 170, in a token 172. Receiving the authentication information, sending it to authentication service component 112 and receiving the return token with the claims therein is indicated by blocks 174, 176 and 178 in FIG. 2B.

Application 105 then permits user 102 to access various features of the application 105, based upon the claims returned in token 172. That is, certain features may be available to certain users. For instance, user 102 may now be able to access certain data from ERP data store 108, based upon the claims returned in token 172. Providing data access features of application 105 to user 102 is indicated by block 180 in FIG. 2B.

It is then assumed that user 102 desires to access certain ERP data and inputs parameters identifying the specific data desired. Application 105 then sends the user name and claims along with the data request 166 to data accessing system 110. This is indicated by block 182 in FIG. 2B.

Data accessing system 110 then validates the claims by accessing registration data store 126. Once the user is validated, data accessing system 110 accesses ERP system 106 as the user. This is indicated by block 184 in FIG. 2B. This can be done in a number of different ways. For instance, in one embodiment, the user name input with data request 166 is impersonated by ERP service component 122 in accessing ERP system 106. For instance, assume that hotmail.com is a domain name given for user 102 in ERP system 106. ERP service component 122 can use a CallContext call into ERP system 106 as user 102 in order to process request 166.

The data request and user info 128 is provided to role-based accessing component 130 which provides role-based accessing of ERP data in ERP data store 108. ERP system 106 uses its own data security system and security policies in providing data to user 102. By way of example, many ERP systems have role-based data access implemented in a corresponding security system. The role played by an individual user 102 dictates the type of data access provided by ERP system 106 to the ERP data in data store 108.

For instance, a manager in the organization may have different data access privileges than a sales associate. Similarly, a manager in one organizational unit of an enterprise may have different data access privileges for data corresponding to another organizational unit of the same enterprise. Of course, there are a wide variety of different types of role-based data access policies which can be implemented, as desired. Providing the mobile user 102 with role-based access to ERP data in data store 108, using the security system and policies of ERP system 106, is indicated by block 186 in FIG. 2B.

System 110 then returns ERP data 132 to application 105 for display to user 102. This is indicated by block 188 in FIG. 2B.

FIG. 1 shows that once mobile device 104 is registered with system 110, and activated within ERP system 106, it functions as the other registered mobile devices 116, 118 and 120. Push service component 124 (shown as a cloud service in cloud 125) can be used to push various portions of ERP data, or alerts or notifications to the various registered mobile devices 116, 118 and 120. For instance, users of those mobile devices may request that certain alerts, notifications, or other data, be provided to them automatically. The users of those registered mobile devices 116, 118 and 120 can input ERP data, into ERP data store 108, through ERP mobile data accessing system 110. In order to gain access to the ERP data, the registered mobile devices 116, 118, 120 illustratively provide their registration information to system 110. This information is used by component 122 to obtain ERP data from system 106 and provide that data to registered mobile devices 116, 118, and 120.

In another embodiment, users of mobile devices 116, 118 and 120 request to receive alerts or notifications when certain events occur, such as when certain data is modified, entered or deleted in data store 108. In that case, ERP service component 122 generates alterts requests and receives alert responses (collectively 131) from ERP system 106. The alerts and notifications 135 are then transmitted to mobile devices 116, 118 and 120 through push notification service component 124. Component 124 is shown, by way of example, in cloud 125. Thus, it can be offered as a cloud-based service, in one embodiment.

Figure 3:
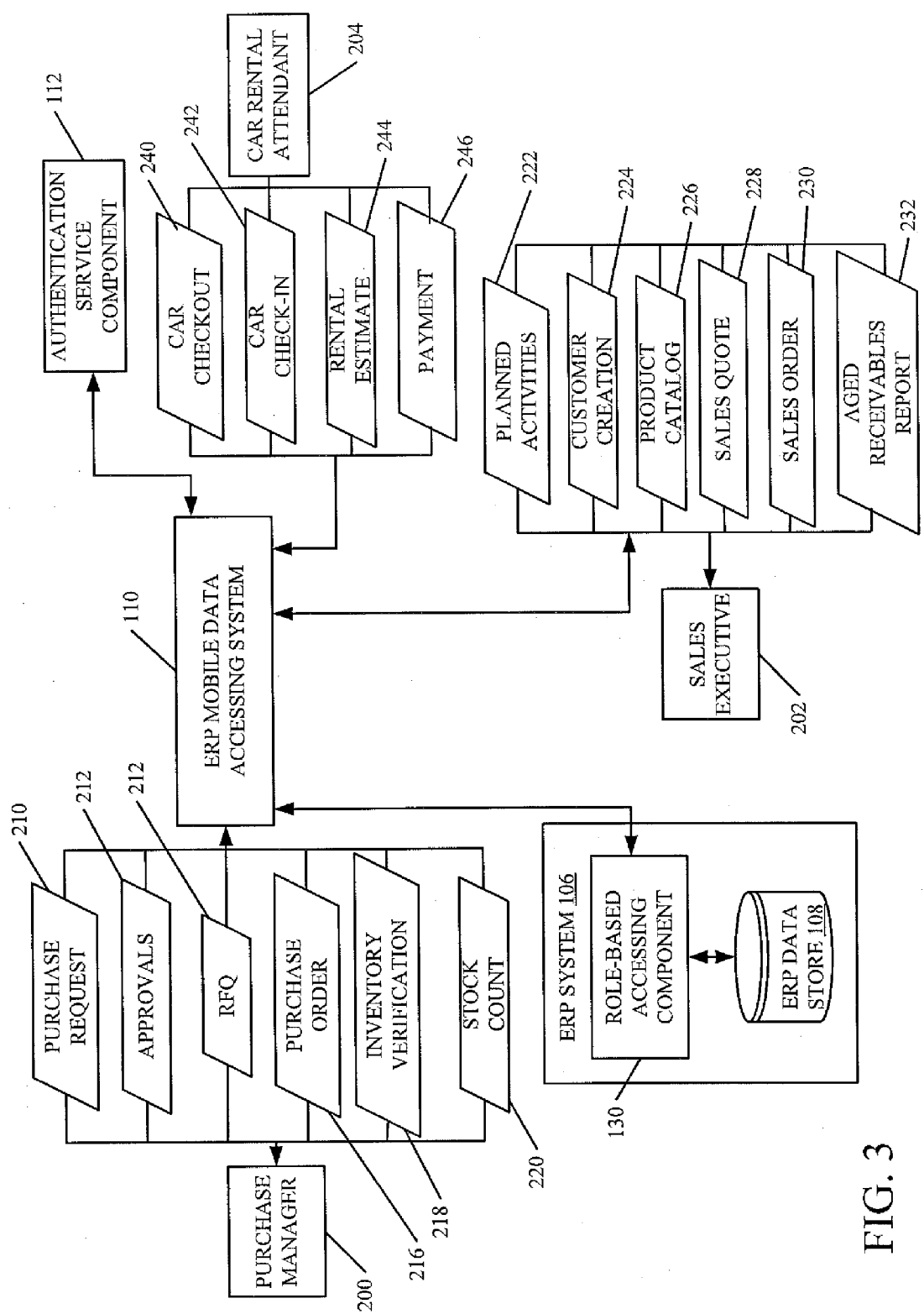
FIG. 3 is a block diagram illustrating a plurality of different use scenarios for accessing ERP data.

FIG. 3 is a block diagram illustrating three different exemplary use scenarios. Of course, it will be noted that the three use scenarios depicted in FIG. 3 are given by way of example, and a wide variety of other use scenarios are contemplated as well. In any case, FIG. 3 shows a use scenario in which a purchase manager 200, a sales executive 202, and a car rental attendant 204 use registered mobile devices (such as mobile devices 104, 116, 118 or 120) to access ERP data in ERP system 106. Some of the items in FIG. 3 are similar to those shown in FIG. 1, and are similarly numbered.

In a first use scenario, a purchase manager 200 interacts with ERP mobile data accessing system 110 to obtain ERP data from ERP system 106. Role-based accessing component 130 implements security policies to provide purchase manager 200 with the ERP data. In the embodiment shown in FIG. 3, purchase manager 200 can send and receive purchase requests 210, approvals 212, requests for quote (RFQs) 214, purchase orders 216, inventory verification communications 218, and stock counts 220. In each example, it is assumed that manager 200 has a registered mobile device that generates user interface displays and also has user input mechanisms to allow manager 200 to interact with system 110 to access ERP data in system 106.

More specifically, purchase manager 200 may provide purchase request 200 to ERP system 106, or may receive purchase requests 210, that are submitted by other people accessing the system. In that case, manager 200 can authorize those purchase requests, if needed.

In another embodiment, purchase manager 200 is responsible for approving certain work flows in the organization. When the manager's approval is required, ERP system 106 generates an alert that is to be sent as a message to manger 200. When manager 200 receives an approval alert 212, and actuates (e.g., clicks on) that alert, manager 200 can use an input mechanism on his or her mobile device to approve the described work flow.

Manager 200 can interact with ERP system 106 in creating or responding to RFQs 214 and in generating or authorizing purchase orders 216. Manager 200 may also review or request inventory verifications that provide information related to certain inventories. In addition, manager 200 can request or automatically receive stock counts 220 that indicate an amount of a given product that is currently in stock at various locations in the organization.

In one embodiment, manager 200 can set up different message queues for receiving the different types of information 210-220 in queue form. When manager 200 opens a link to ERP system 106 in the manager's mobile device, the manager can illustratively ask to see the various items of communication in each of the given queues. The manager can then, using user input mechanisms displayed on or disposed on the mobile device, interact with those messages or communications in any desired way.

Sales executive 202 can perform some similar functions as manager 200, but ERP system 106 may use accessing policies and role-based accessing component 130, to provide sales executive 202 with different types of information. In the embodiment shown in FIG. 3, sales executive 202 has access to planned activities information 222, customer creation information 224, product catalog information 226, sales quote information 228, sales order information 230 and aged receivables report 232. In each of the examples with respect to sales executive 202, it will be appreciated that sales executive 202 illustratively has a registered mobile device that generates user interface displays on the registered mobile device and also provides user input mechanisms that allow the user to provide user inputs and interact with ERP system 106 through the user interface display.

Planned activities information 222 may simply be sales related activities that are planned for executive 202, or for the direct reports of executive 202. In some cases, executive 202 may need to authorize those activities or may simply need to be notified of them.

Customer creation information 224 illustratively allows sales executive 202 to create a customer record corresponding to a new customer. For instance, if executive 202 has a new sales lead, executive 202 may create a customer entity that represents that new sales lead so that various information can be entered, relating to that customer.

Product catalog information 226 may include detailed information about various products sold by sales executive 202, as well as current inventories or other information related to sales of those products.

Sales quote information 228 illustratively allows sales executive 202 to generate a sales quote entity which specifies a sales quote that can be presented to one or more customers. In addition, sales executive 202 may receive sales quote information 228 that needs to be approved, or authorized by, sales executive 202.

Sales order 230 allows sales executive 202 to generate an actual sales order as opposed to a quote. For instance, if a customer actually places an order, an entity representing that order can be generated and provided to EPR system 106 so that the order can be processed, and filled. Also, sales executive 202 may be required to review, approve, or otherwise authorize sales orders to be filled, and in that case sales executive 202 can illustratively communicate with ERP system 106 regarding sales order 230 as well.

Sales executive 202 may be responsible for certain orders that have been filled, but for which customers have not yet paid. In that case, ERP system 106 may maintain an aged receivables report 232 indicating accounts receivable broken up by customer, by product line, or otherwise. Sales executive 202 may illustratively be able to review the aged accounts receivable report 232 at least for the products which sales executive 202 has sold.

Car rental attendant 204 also illustratively includes a registered mobile device for interacting with ERP system 106, through ERP mobile data accessing system 110. In the embodiment shown in FIG. 3, car rental attendant 204 can illustratively send or receive car checkout information 240, car check-in information 242, rental estimate information 244 and payment information 246.

In one embodiment, car checkout information 244 allows car rental attendant 204 to generate a checkout entity that identifies a customer that is checking out a certain type of automobile. Car check-in information 242 illustratively allows attendant 204 to generate an entity indicating that the customer has returned or checked the car back into the rental facility.

Rental estimate 244 illustratively allows car rental attendant 204 to generate an entity that specifies an estimate for a given car, to a customer. Payment information 246 allows car rental attendant 204 to create a entity that is indicative of a rental car customer paying his or her bill. Again, car rental attendant 204 illustratively includes a registered mobile device that generates user interface displays, and also user input mechanisms that allow attendant 204 to interact with ERP data in ERP system 106 through ERP mobile accessing system 110.

It should also be noted that system 100 is shown as dividing the functionality up into various systems and components. However, this is exemplary only. The functions could be combined into fewer systems and components, or divided up further. Similarly, the systems and components can be implemented on a variety of different devices or they can be implemented on fewer devices. They can also be implemented in a wide variety of different architectures, including a cloud computing architecture.

Cloud computing provides computation, software, data access, and storage services that do not require end-user knowledge of the physical location or configuration of the system or components that delivers the services or functions. In various embodiments, cloud computing delivers the services or functions over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices 104, 116, 118 and 120 directly, or in other ways.

Figure 4:
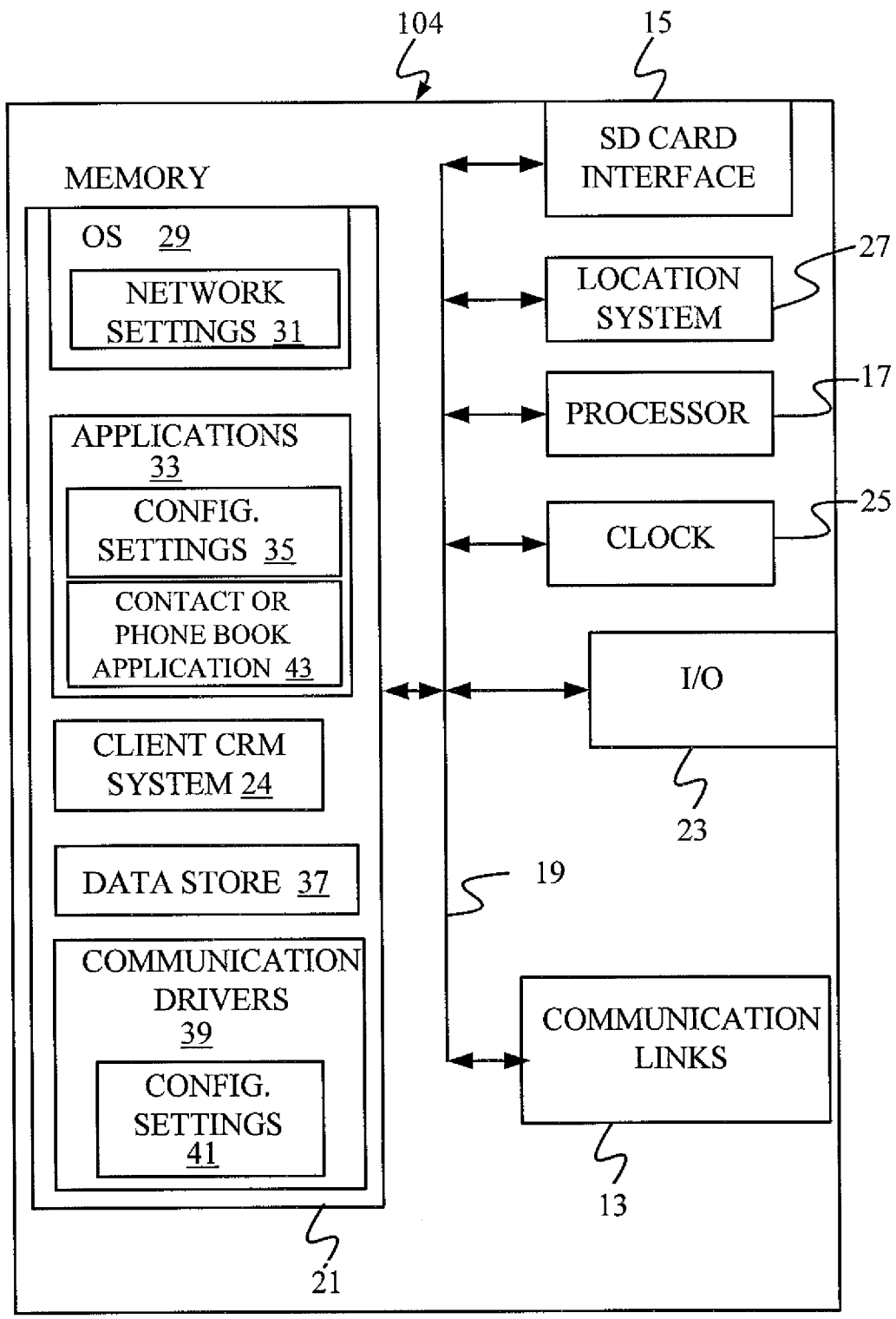
FIGS. 4-6 illustrate exemplary embodiments of handheld mobile devices.
Figure 5:
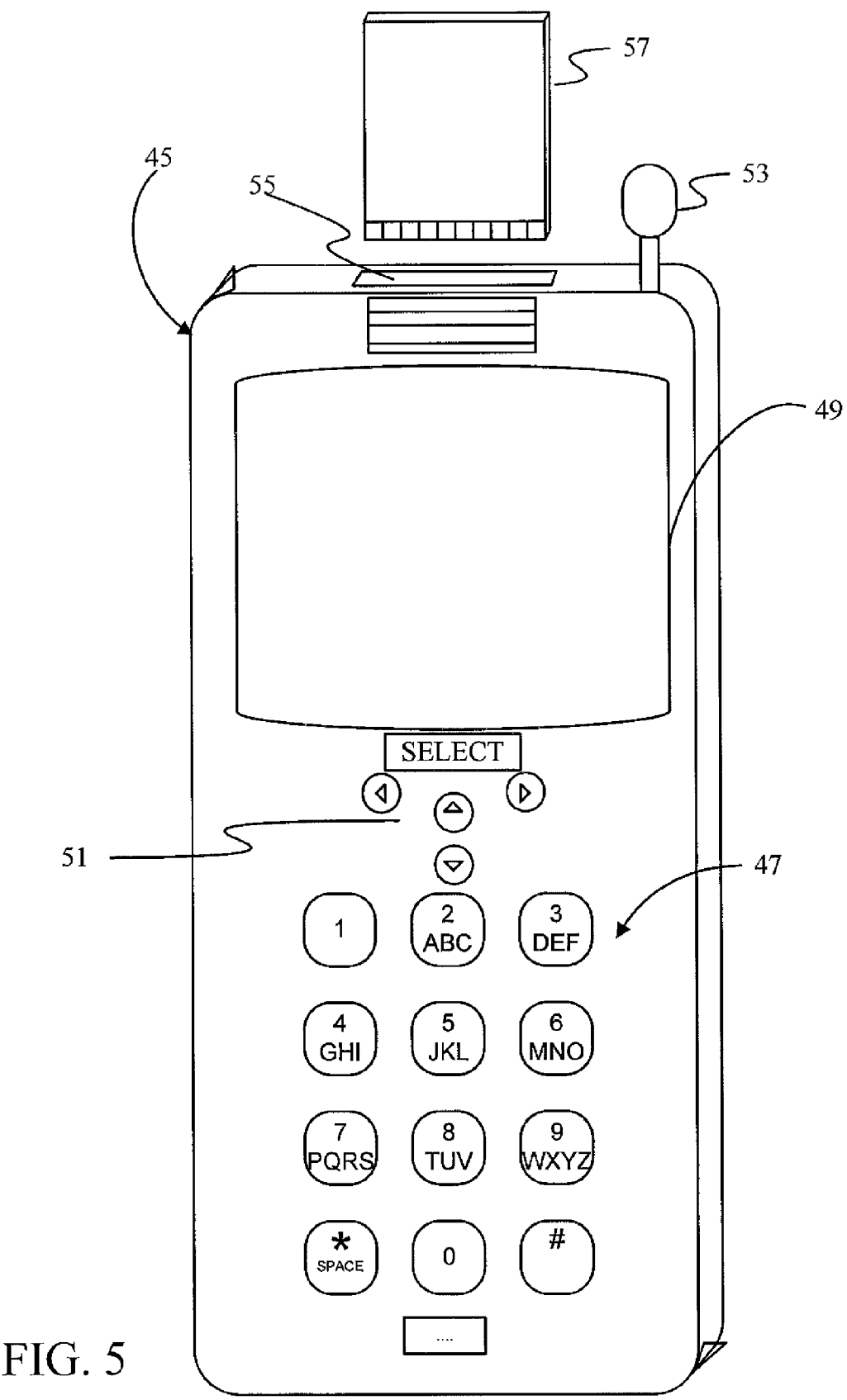
Figure 6:
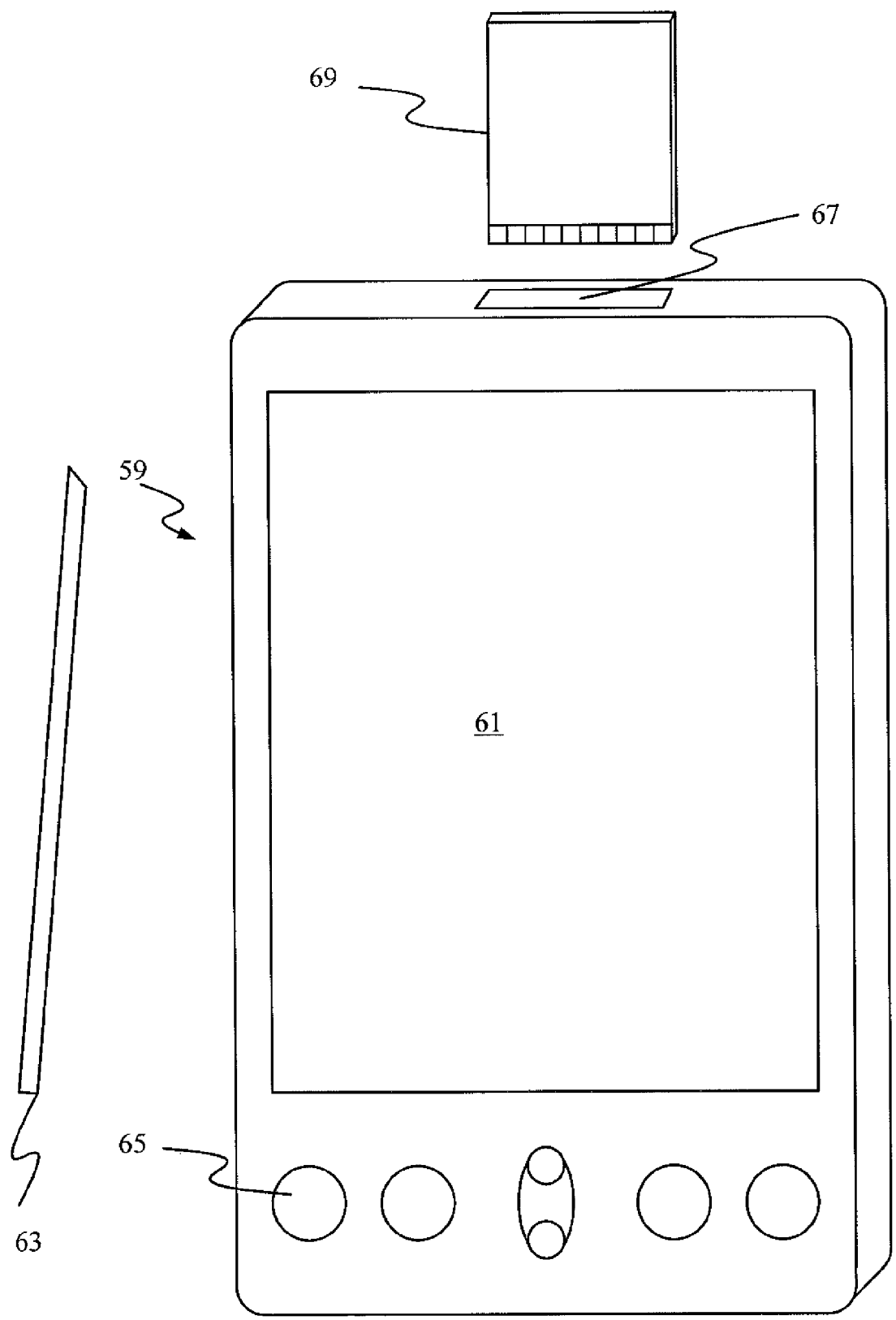

In any case, FIG. 4 is a simplified block diagram of one illustrative embodiment of a handheld or mobile computing device that can be used as client devices 104, 116, 118 and 120, in which the present system can be deployed. FIGS. 5 and 6 are examples of handheld mobile devices.

FIG. 4 provides a general block diagram of the components of a client device 104, 116, 118, 120 that can run components of system 100 or that interacts with system 100, or both. They will collectively be referred to only as device 104, for the sake of simplicity. In the device 104, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processor 17 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 104 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 104. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Portions of system 110 or the items in data store 126 or 108, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 104 or applications that are installed during use, although these can be part of operating system 29, or hosted external to device 104, as well.

FIGS. 5 and 6 provide examples of devices 104 that can be used, although others can be used as well. In FIG. 5, a smart phone or mobile phone 45 is provided as the device 104. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 6 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scrole through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 104 are possible. Examples include tablet computing devices, music or video players, and other handheld computing devices.

Figure 7:
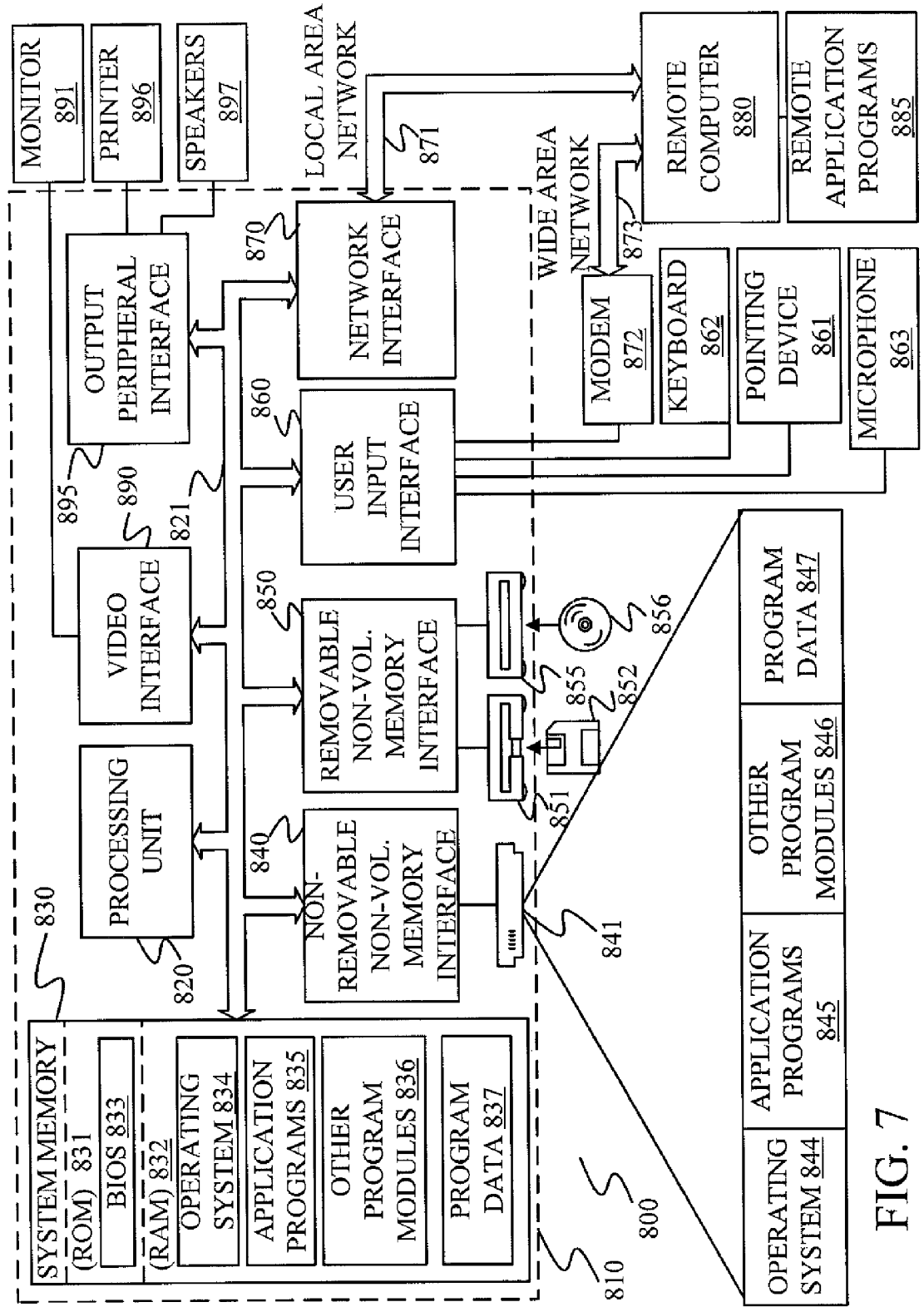
FIG. 7 is a block diagram of one illustrative computing environment in which components of the system of FIG. 1 can be implemented.

FIG. 7 is one embodiment of a computing environment in which system 100, or portions thereof (for example) can be deployed. With reference to FIG. 7, an exemplary system for implementing some embodiments includes a general-purpose computing device in the form of a computer 810. Components of computer 810 may include, but are not limited to, a processing unit 820 (which can be processor 17), a system memory 830, and a system bus 821 that couples various system components including the system memory to the processing unit 820. The system bus 821 may be any of several types of bus structures including a memory bus or memory controleer, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of providing data access to business data of a business, comprising:
   receiving a data request including a signed token containing at least one claim from a given mobile device;
   validating a signature of the token;
   validating the at least one claim;
   sending the data request and user information to an enterprise resource planning (ERP) business data system that automates business activity related to management across an organization, that includes the business data; and
   providing role-based access to a plurality of mobile devices, comprising pushing different business data to different ones of the plurality of mobile devices based on different roles associated with the mobile devices, wherein providing role-based access comprise:
   after the given mobile device is validated in the business data system,
   providing the given mobile device with role-based access to the business data, including entities that represent business data records in the business data system, the role-based access being based on a role corresponding to the at least one claim and based on role-based access policies of the business data system; and
   wherein the at least one claim allows access to features of an application executing on the given mobile device.

2. The computer-implemented method of claim 1 and further comprising:
   registering the given mobile device as a registered mobile device for later data accesses.

3. The computer-implemented method of claim 2 wherein providing role-based access comprises:
   receiving a user interaction with business data from the registered mobile device that is associated with a role for which the user interaction is authorized.

4. The computer-implemented method of claim 3 wherein receiving a user interaction comprises:
   pushing a list of approval requests, generated in the ERP business data system, to the registered mobile device; and
   receiving a user interaction indicative of the user of the registered mobile device approving a workflow associated with one of the approval requests in the list.

5. The computer-implemented method of claim 3 wherein receiving a user interaction, comprises:
   receiving a user interaction from the registered mobile device indicative of the user performing one of creating, deleting or modifying a business data object in the business data system.

6. The computer-implemented method of claim 1, and further comprising registering a signing key with an authentication service component.

7. The computer-implemented method of claim 6, and further comprising rotating the signing key.

8. A business data accessing system, comprising:
   an authentication service component receiving claims-based authentication data from a mobile device and performing authentication, based on the claims-based authentication data, the authentication service component being configured to provide, to the mobile device, a token containing at least one claim that allows access to features of an application executing on the mobile device;
   a push service component receiving registration information from a set of registered mobile devices and pushing enterprise resource planning (ERP) business data from an ERP business data system to the registered mobile devices;
   a role-based accessing component, implementing role-based access to the ERP business data for each given registered mobile device based on a role associated with each given registered mobile device; and
   a computer processor being a functional component of the system and activated by the authentication service component and the push service component to facilitate performing authentication and pushing business data.

9. The business data accessing system of claim 8 wherein the role-based accessing component is part of the business data system.

10. The business data accessing system of claim 8 wherein the role-based accessing component implements role-based accessing policies of the business data accessing system.

11. The business data accessing system of claim 8 and further comprising a mobile data accessing system including a registration data store storing registration data associated with the set of registered mobile devices.

12. The business data accessing system of claim 8 wherein the authentication service component generates authentication detail corresponding to the claims-based authentication data and provides the authentication detail to the business data system for validation of the mobile device.

13. The business data accessing system of claim 8 wherein the set of registered mobile devices comprise a set of hand held mobile devices.

14. The business data accessing system of claim 13 wherein the set of hand held mobile devices comprise a set of smart phones.

15. A method of providing data access to business data of a business using a mobile device having a processor, comprising:

receiving claims-based authentication information on the mobile device;

sending the claims-based authentication information to a selected authenticator;

receiving a token from the authenticator, authenticating the mobile device;

sending the token and a data request to an enterprise resource planning (ERP) business data system, that includes ERP data as the business data, for validation; and after the mobile device is validated in the ERP business data system, providing the mobile device with role-based access to the ERP data in the ERP business data system by pushing ERP data to the hand held mobile device, content of the ERP data being determined by a role associated with the mobile device and wherein the claims-based authentication information provides access to features of an application executing on the mobile device.

16. The method of claim 15, wherein the claims-based authentication information comprises previous authentication information that authenticates a user in a different context, other than in a context of the ERP business data system.

17. The method of claim 16, wherein the previous authentication information comprises social network authentication information that authenticates the user in a social network.

\* \* \* \* \*